(12) United States Patent
Poynter

(10) Patent No.: US 8,777,234 B2
(45) Date of Patent: Jul. 15, 2014

(54) CONTROL ARM SKATE

(76) Inventor: James Rodney Poynter, Bellevue, KY (US)

( * ) Notice: Subject to any disclaimer, the term of this patent is extended or adjusted under 35 U.S.C. 154(b) by 72 days.

(21) Appl. No.: 13/479,996

(22) Filed: May 24, 2012

(65) Prior Publication Data

US 2012/0301255 A1    Nov. 29, 2012

Related U.S. Application Data

(60) Provisional application No. 61/519,528, filed on May 24, 2011.

(51) Int. Cl.
*B62B 17/02* (2006.01)

(52) U.S. Cl.
USPC .................................................. 280/7.12

(58) Field of Classification Search
USPC .................................................. 280/7.12
See application file for complete search history.

(56) References Cited

U.S. PATENT DOCUMENTS

| | | | |
|---|---|---|---|
| 1,438,326 A * | 12/1922 | Nelson | 280/13 |
| 2,589,602 A * | 3/1952 | Clark | 280/13 |
| 2,741,486 A * | 4/1956 | Torgrimson | 280/13 |
| 2,818,265 A * | 12/1957 | Calderwood | 280/13 |
| 2,883,204 A * | 4/1959 | Tomasovich | 280/13 |
| 3,321,211 A * | 5/1967 | Bryant et al. | 280/13 |
| 3,521,897 A * | 7/1970 | Lechner et al. | 280/13 |
| 3,649,040 A * | 3/1972 | Snider, Jr. | 280/14 |
| 3,756,615 A * | 9/1973 | Bray | 280/14 |
| 3,774,926 A * | 11/1973 | Chase | 280/13 |
| 3,901,525 A * | 8/1975 | O'Brien et al. | 280/14 |
| 4,116,455 A * | 9/1978 | Dotson et al. | 280/7.12 |
| 4,161,323 A * | 7/1979 | Wetteland | 280/7.12 |
| 4,194,753 A * | 3/1980 | Schrishuhn, Jr. | 280/13 |
| 5,413,361 A * | 5/1995 | Mosher | 280/7.12 |
| 5,427,390 A * | 6/1995 | Duncan et al. | 280/8 |
| 6,682,082 B1 * | 1/2004 | Dalen | 280/7.12 |
| 8,418,792 B2 * | 4/2013 | Rivard | 180/183 |

* cited by examiner

*Primary Examiner* — Jeffrey J Restifo
(74) *Attorney, Agent, or Firm* — Wood, Herron & Evans, LLP

(57) ABSTRACT

A control arm skate of synthetic material facilitates movement of a disabled vehicle. A sliding block has two inclined ends facilitating sliding of the block in opposite directions with a disabled vehicle thereon without further damage to the vehicle or support surface over which it is moved. An upper block face is configured to receive a vehicle part so pulling of the vehicle draws the block with it, sliding over a surface while bearing vehicle weight.

10 Claims, 3 Drawing Sheets

CONTROL ARM SKATE

RELATED APPLICATION

Applicant claims benefit of the filing date of U.S. provisional patent application of the same title, Ser. No. 61/519,528, filed May 24, 2011, said application herewith incorporated by reference as if fully set forth herein.

FIELD OF THE INVENTION

This invention relates to the handling of disabled vehicles and other items where wheeled aids are not readily available. More particularly, one embodiment of the invention relates to the movement of disabled vehicles from one location to another where one or more vehicle wheels, wheel assemblies or suspensions thereof are damaged or incapacitated.

BACKGROUND OF THE INVENTION

In the towing industry, there is a need from time-to-time to relocate a motor vehicle or tow an apparatus such as a non-self-propelled trailer that has a defective wheel or where a wheel is separated from the main part of the original attachment point of the vehicle. When this happens, it leaves a ball joint, axle or control arm where the wheel and tire had been. Without a wheel, these other components extend below the vehicle or trailer and rest on the ground. There may also be some other part of the vehicle that defines a low point and will drag on the surface over which the vehicle is transported. There is a need to support the vehicle to facilitate the movement of the disabled vehicle or apparatus without further damage to the vehicle or to the surface over which it is moved.

Thus, towing and/or recovery operators utilizing flat beds/carriers/trailers etc., many times encounter disabled vehicles, needing to be relocated to a place of temporary storage or repair, and that have experienced loss or damage to one or more ball joints, control arms, axles, tire and wheel assemblies or other parts. Many devices are in use to facilitate towing or movement where the vehicle wheels are operable. Dollies, go jacks and towing skates, for example, address rubber tired apparatuses which go between the lower surface of the rubber tire and the upper surface of the carrier bed. Where, however, a wheel or wheel assembly is missing or disabled, the missing and/or damaged part or parts create a problem loading and unloading without further damage to the disabled vehicle, or the upper surface of the recovery vehicle and present the potential of igniting flammable fluids at the scene.

Currently towing and/or recovery operators and emergency personnel utilize wood blocks and/or wood boards or just relocate the defective vehicle utilizing the winch on the recovery vehicle to overcome any resistance encountered, disregarding any further damage to the disabled vehicle, the recovery apparatus or safety of the operator or persons within the area. Currently various pieces of wood are utilized by the more experienced operators when encountering defective/inoperable vehicles caused by broken ball joints, control arms, missing tire wheel assemblies, etc. where parts of the vehicle are making contact with the surface where it is resting. Wood blocks or boards tend to not stay in the desired position when the vehicle is moved for lack of retaining provisions. Wood is subject to splitting and is easily damaged in use thus requiring time consuming and costly replacement. Storage of wood on the recovery vehicle, unprotected from the weather, also leads to deterioration and frequent replacement. Wood is also prone to the absorption of oil and other liquids found on and around the scene of vehicle disablement. Usually two or more pieces of wood are required, adding to the number of articles stored in the limited space on the recovery vehicle and adding to the numbers of articles increasing the risk of problems. The wood blocks, having a smooth upper surface do not retain the damaged parts in the required position throughout the loading/unloading procedure and many times do not provide sufficient clearance between the lower surface of the defective part and the upper surface upon which it is resting and/or being moved. Square wood blocks are difficult to slide and require extra ramps or other means to assist the movement of the disabled vehicle from the resting surface to and from the transport vehicle or temporary relocation. Wood does not provide a consistent reduction in resistance therefore creating erratic, excessive time consuming and unpredictable results. The vehicle can fall off the wood blocks.

One primary purpose then of this invention is to aid the towing and recovery operator (wrecker operator) or an emergency response person when assisting a motorist whose automobile has become disabled due to broken parts such as control arms, ball joints, disengaged wheels and tires, axles, seized bearings, etc. Usually, the operator must relocate the disabled vehicle utilizing a truck equipped with the proper lift and tow device or what is known in the industry as a flatbed/rollback/tilt tray/carrier or a tilt trailer attached to a towing vehicle. The flatbed, equipped with a winch and wire rope assembly has become the vehicle of choice in recent years because of its versatility. When the flatbed operator arrives on the scene of this type of disablement he or she needs to be able to load the vehicle onto the flatbed, transport it to a place of repair or temporary storage and unload without further damage to the disabled vehicle or to the flatbed upper surface in a timely manner. Many flatbeds and/or tilt trailers upper surfaces are fabricated from aluminum, steel, and/or wood that is easily damaged by broken, jagged parts on the wrecked/disabled vehicle if some means of protection is not provided during the loading, unloading relocation process.

It is one objective of the invention to facilitate the movement or transport of a disabled vehicle without further damage to the vehicle or to the transport used to move the vehicle to a repair or storage facility.

Another objective of the invention has been to provide improved apparatus for transporting a disabled vehicle.

SUMMARY OF THE INVENTION

To these ends, a preferred embodiment of the invention comprises a monolithic one-piece skate for use between a supporting surface and the lower elements or surface of a damaged vehicle part such as a wheel assembly, axle, control arm, ball joint, seized bearing or the like. A preferred embodiment is found in the combination of the structure and material of the invention facilitating relocation of a damaged vehicle where a wheel or wheel assembly is missing.

The main body of the invention is constructed of synthetic material, preferably recycled plastic, such as polypropylene. The body comprises a unitary, plastic block, in one embodiment, six inches wide, six inches high and eighteen inches long. The block composition is of materials providing a low, nearly constant co-efficient of friction as the block, bearing vehicle weight, slides over a support surface.

The lower front and rear of said block is inclined, preferably curved, to form a sled runner effect on the front and rear lower sections thus enabling it to be used in both directions and not having a front or back. This radius on both lower ends allows the operator to slide and load and unload the disabled vehicle without additional ramps or boards on most of the recovery apparatuses in use today and without having to reverse the invention's position, as vehicle movement is reversed between load and unload motions.

The block is of sufficient height to minimize parts from dragging or inadvertently being damaged (secondary damage) as the vehicle is moved. The top mid section has an area of material removed of sufficient configuration to receive and accommodate the anticipated defective parts from becoming disengaged from the block during use. This material has been removed in shaped areas of sufficient volume in anticipation of receiving various parts that will be encountered. Angle cuts on the top surface can be at varying degrees, angled on opposing sides or even be cut to make a square or rectangular opening. A circular shaped relief area can also be deepened, widened, made in any variance of a shape or eliminated altogether. The cutout shapes have many variations.

For example, a recess to accept the control arm/ball joint/axle is provided in the midsection of the top surface to maintain the vehicle/damaged parts in the desired position while loading and unloading and/or relocating.

Inclined or radiused ends of the invention can be made more or less pronounced or can be in a straight line taper. More holes or circular cut-outs can be added as uses are developed and vehicle designs change. A hole or multiple holes through the body crosswise and/or lengthwise or a screw eye type attachment can be provided to be used as a fastening device securing the defective mechanism to the invention. The current height, width and length can be altered. Any of the aforementioned reconfigurations maintain the original concept performing the same or similar function.

In use, this invention is placed between the lower surface of the damaged part and the upper surface of the area where the vehicle is resting. This allows the vehicle to be loaded or unloaded, reducing or eliminating the possibility of further damage to the disabled vehicle or the surface where it is resting (roadway) and reduces the possibility of becoming an ignition source. Damage to the upper surface of the recovery bed is also minimized or eliminated. In cases of missing tire or wheel assemblies this invention can be used as a temporary substitute for the missing part in the loading and unloading process without causing, or at least minimizing further damage.

Protection is thus provided by placement of the invention between the upper surface where it is resting and the lower surface of the defective parts. The disabled vehicle must first be raised to a height sufficient for the invention to be placed under the lower surface of the lowest part, usually the control arm or axle then the vehicle lowered onto the invention. Thereafter, the height of the block allows the vehicle to be drawn laterally and up an inclined upper surface of a towing vehicle, for example, utilizing the winch and wire rope assembly to slide the vehicle along the receiving surface. The block simply slides under the weight of the vehicle it supports.

This invention can be used anywhere there is a need to relocate articles where wheeled equipment is not available and the upper surface is of sufficient strength to support the weight being relocated. It can be used in Fire & Rescue and other professions that have interactions with disabled vehicles/apparatus. Factories and warehouses where forklifts and overhead cranes are not available or space is limited would be another area where this invention could be utilized. It can be used at marinas or other locations where the tire/wheel assembly has come disengaged from a boat/utility trailer. The vehicle being used to tow the boat/utility trailer would be able to relocate the trailer utilizing the invention a short distance to either a place of repair or a place of temporary safety.

These and other advantages will be readily apparent from the following written description and from the drawings in which:

DETAILED DESCRIPTION OF THE INVENTION

Figure 1:
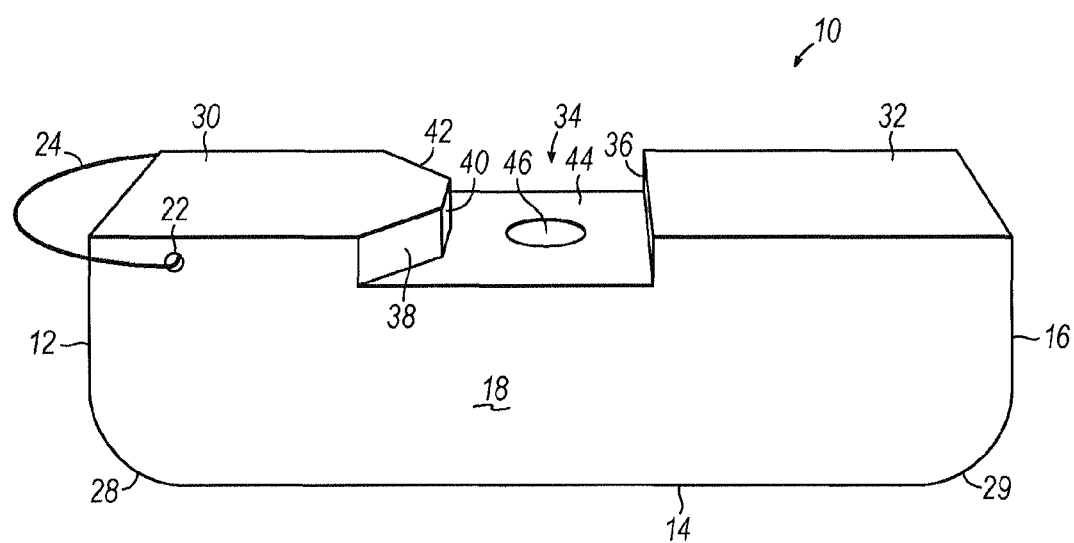
FIG. 1 is an perspective illustration of one embodiment of the invention.
Figure 2:
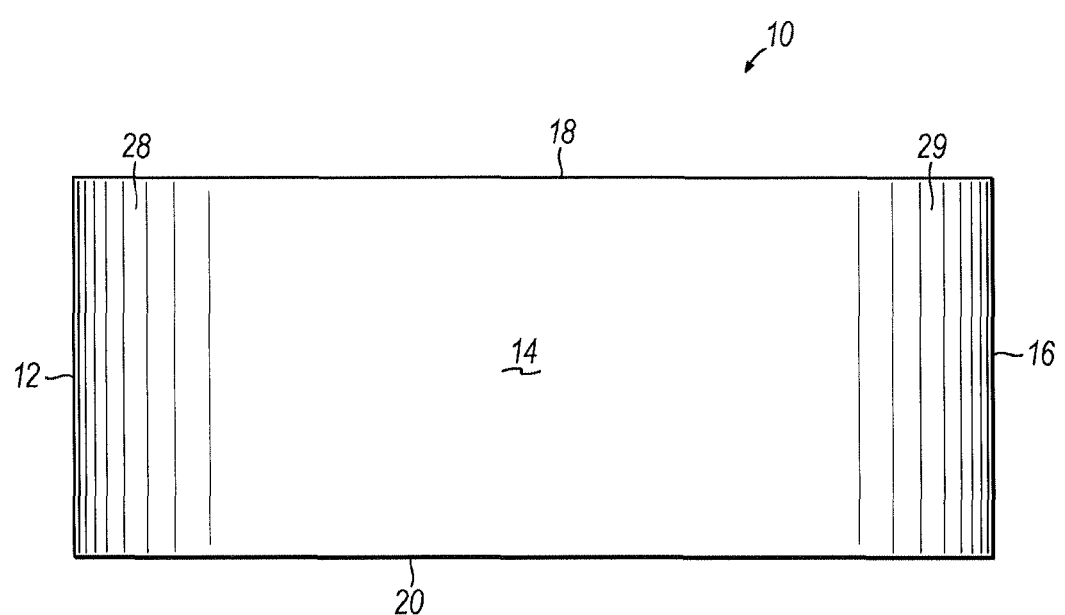
FIG. 2 is a bottom view of the embodiment of FIG. 1.

Turning now to the FIGS., a preferred embodiment includes a monolithic main body or block 10 of preferably synthetic material such as plastic having a preferably relatively low co-efficient of friction (as compared to wood, for example) to facilitate sliding over a support surface such as asphalt, concrete, aluminum, steel, other plastic or the like as may be found, for example, on a roadway, transport vehicle, repair or storage facility or the like. Preferably recycled polypropylene is used.

Other materials could be used, such as virgin plastic, wood, compressed wood, and/or mixtures of various materials though without certain of the advantages noted herein. However, the suggested material will not absorb oils and is not subject to splintering and deterioration as is wood.

Block 10 has a lower surface 14, two ends 12 and 16 and two sides 18, 20. Preferably the block 10 may be about 18 inches long and about 6 inches wide and 6 inches tall.

A through-hole 22 accommodates a handle 24 such as a flexible wire attached to block 10 for handling, carrying or moving block 10 manually. Wire 24 is not intended for pulling block 10 when it bears weight of a vehicle.

Ends 12, 16 of block 10 are inclined, meaning tapered, radiused or rounded, respectively at 28, 29 from the ends 12, 16 respectively, to bottom or lower surface 14 providing a sled-like or runner configuration to facilitate sliding of block surface 14 across or along a support surface. Due to both inclined ends, the block 10 is unidirectional in function and a vehicle on which it rests can be moved or slid in opposite directions.

The material of block 10 is selected that the block has a crush resistance sufficient to withstand the vehicle weight applied to it when supporting the lower surface of a damaged or disabled part like an axle, control arm, joint, wheel assembly or the like.

Block 10 has an upper surface or face, as shown, of multiple configurations. These configurations are selected to receive the known shapes of standard automotive parts and also to receive misshapen parts resulting from a wreck, collision, part collapse or failure or the like. The figures illustrate but several of the upper surface configurations and shapes of block 10. Neither the block size nor the configurations are limited, and can be of any suitable size or shapes.

Figure 3:
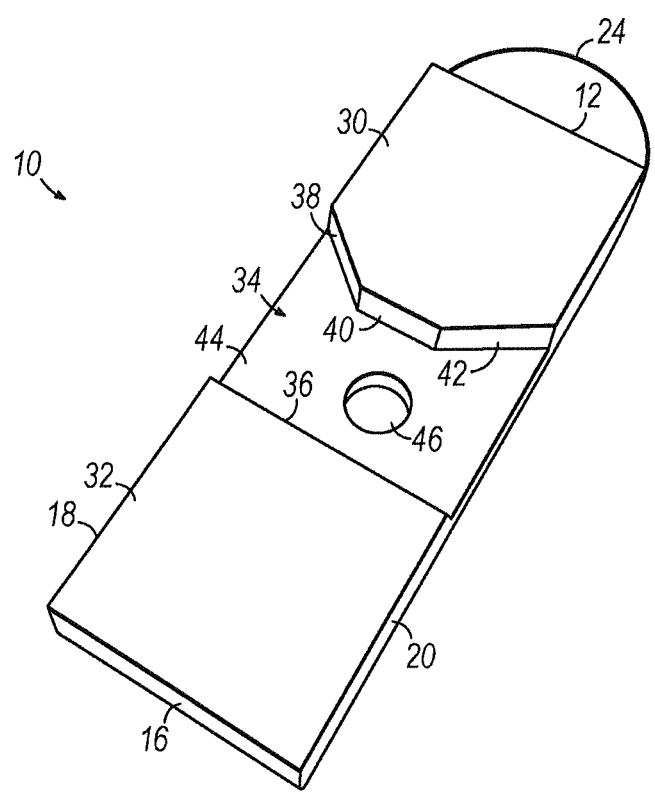
FIG. 3 is another perspective illustration of the upper surface topography of the invention of FIG. 1.

In particular, the upper surface or face of one embodiment of block 10 is shown in FIGS. 1 and 3. There are two relatively flat surfaces 30, 32 lying in essentially the same plane but spaced apart. A transverse channel 34 extends across the width of body 10 between surfaces 30, 32. Channel 34 is defined on one side by vertical surface 36. The other side of channel 34 comprises multiple surfaces 38, 40 and 42. Surfaces 38, 42 are inclined toward end 12 of block 10, while surface 40 is in a plane parallel to surface 36. Channel 34 has a flat bottom surface 44.

A circular recess 46 of any suitable diameter and depth is defined in surface 44 and block 10.

The particular configuration of the upper face of block 10 is suitable to receive the lower surface of a damaged or disabled vehicle, such as a ball joint, axle, control arm, wheel assembly or other vehicle part, and to be held by such parts when the vehicle is supported on the block 10 and is moved so as to slide block 10 along a supporting surface. The upper face configurations engaging a vehicle cause block 10 to slide when the vehicle is pulled; it cannot slide off the block 10.

In use, a damaged vehicle is lifted or jacked up a distance to accommodate placement of block 10 under a component of the vehicle. The vehicle is lowered onto the block 10, that block receiving one or more vehicle parts.

Thereafter, the vehicle is winched or pulled across a supporting surface, such as a roadway, then up onto a supporting surface, such as a surface of a rescue vehicle bed. As the vehicle is pulled, block 10, facilitated by its composition, by inclined ends 28 or 29 (whichever leads) and surface 14, slides along, pulled by the engagement of a vehicle part on one or more of the surfaces of the upper face of block 10.

Thus, in a typical vehicle disablement situation, a tow is called for. An operator arrives to tow the vehicle with a tow truck equipped with the proper lift and tow device or what is known in the industry as a flatbed/rollback/tilt tray/carrier or a trailer attached to a towing vehicle. The flatbed has become the vehicle of choice in recent years because of it versatility, but it does have its limitations. When the flatbed operator arrives on the scene of this type of disablement he or she needs to be able to load the vehicle onto the flatbed, transport it to a place of repair or temporary storage and unload without further damage to the disabled vehicle or to the flatbed upper surface. Many flatbeds are fabricated from aluminum or other material that is easily damaged by sliding thereon of broken, jagged parts on the wrecked/disabled vehicle if some means of protection is not provided during loading and unloading.

The disabled vehicle is raised to a height sufficient for the block 10 to be placed under the lower surface of the lowest part, usually the control arm, ball joint or axle then the vehicle lowered onto the invention. As the vehicle is lowered onto block 10, the height of block 10 returns the vehicle to approximately the same height as before disablement. The vehicle can now be drawn onto the flatbed's upper surface using the standard winch and wire rope assembly provided.

The width of block 10 is sufficient to support broken or defective parts of the automobile during the loading and unloading process without tipping to either side. The length of block 10 provides support while traversing uneven surfaces encountered in the loading and unloading process. The height of block 10 provides sufficient clearance between the damaged and undamaged parts of the disabled vehicle to assure ease of loading and unloading without further damage. The channel 34 and other upper face configurations of block 10 accept, support and help maintain the damaged parts in the desired position as a single unit during the loading and unloading process. The combination of the upper surface configurations accommodates not only the known shape of standard automotive parts but many inconceivable shapes after wrecks and disablement. The inclined areas 28, 29 are provided to enable the damaged vehicle to be moved to and from the transport vehicle, by providing a lifting action when encountering a minor obstruction such the blunt end of the transport vehicle apparatus.

Typically, only one block 10 is used, for example, under the left or right front or rear wheel area of a vehicle. Two blocks 10 or more could be used to support other vehicle portions. Otherwise, non-disabled wheels and tires support other vehicle portions when the vehicle, supported in part by at least one block 10, is moved.

What is claimed is:

1. A vehicle skate for supporting a vehicle in part when said vehicle is pulled over a supporting surface and comprising:
    a sliding block having an inclined surface at both ends thereof;
    an upper face;
    said upper face having a configuration shaped to receive a portion of a vehicle part, other than a wheel, and to engage said part for pulling said block along as a vehicle supported in part thereon is pulled over a surface on which the block slides;
    wherein said upper face comprises at least a flat surface and a transverse channel extending across said flat surface of said block and;
    wherein said channel has a flat side and an opposed side lying in multiple planes.

2. A vehicle skate as in claim 1 including a recess in a bottom floor of said channel.

3. A vehicle skate as in claim 2 wherein said recess is disposed in the bottom floor of said channel between said flat side and said opposed side.

4. A vehicle skate as in claim 2 wherein said channel is narrower centrally of sides of said block than at said sides, said recess oriented in said bottom floor in a central narrower portion of said channel.

5. A vehicle skate as in claim 1 having a flexible handle attached to sides of said block and extending around one end of said block for manual manipulation thereof.

6. A vehicle skate as in claim 1 wherein said opposed side has a central portion in a plane parallel to said flat side and respective end portions oriented in inclined planes inclined with respect to the plane of central portion.

7. A vehicle skate as in claim 1 wherein said channel is wider at sides of said sliding block that at a location between said sides.

8. A method of moving a disabled vehicle including the steps of:
    lifting a portion of said vehicle;
    lowering a portion of said vehicle onto a sliding block;
    engaging an element of said vehicle with said block;
    pulling said vehicle; and
    sliding said block over a supporting surface while bearing weight of said vehicle on said block;
    said sliding block including an upper surface and a transverse channel therein, with a recess in a floor of said channel between sides of said channel, the method further including the element engaging step of placing said element engaging in said recess and engaging a portion of said vehicle against at least one of said channel sides.

9. A vehicle skate for supporting a control arm of a vehicle when said vehicle is pulled over a supporting surface, said vehicle skate comprising:
    a sliding block having a bottom surface and ends with an inclined bottom surface at said both ends thereof;
    said block having an upper face; having a configuration shaped to receive a portion of a vehicle control arm, and to engage said portion for pulling said block along as a vehicle supported in part thereon is pulled over a surface on which the block sides;

wherein said upper face comprises at least a flat surface and a transverse channel extending across the upper face of block;

wherein said channel has a bottom floor, one flat side extending up from one side of said floor, and an opposed side extending up from other side of said floor and lying in multiple planes and, a recess in said bottom floor of said channel between said flat side and said opposed side.

10. A vehicle skate as in claim 9 wherein said channel intersects sides of said block and is wider at said sides than between them.

\* \* \* \* \*